(12) United States Patent
Tang et al.

(10) Patent No.: US 10,042,202 B2
(45) Date of Patent: Aug. 7, 2018

(54) TRANSFLECTIVE LIQUID CRYSTAL DISPLAY PANE

(71) Applicant: Wuhan China Star Optoelectronics Technology Co., Ltd., Wuhan, Hubei (CN)

(72) Inventors: Yuejun Tang, Guangdong (CN); Zongying Yang, Guangdong (CN); Haiyan Sun, Guangdong (CN)

(73) Assignee: Wuhan China Star Optoelectronics Technology Co., Ltd, Wuhan, Hubei (CN)

( * ) Notice: Subject to any disclaimer, the term of this patent is extended or adjusted under 35 U.S.C. 154(b) by 122 days.

(21) Appl. No.: 15/055,596

(22) Filed: Feb. 28, 2016

(65) Prior Publication Data

US 2017/0123269 A1 May 4, 2017

(30) Foreign Application Priority Data

Oct. 29, 2015 (CN) .......................... 2015 1 0715549

(51) Int. Cl.
*G02F 1/1335* (2006.01)
*G02F 1/1333* (2006.01)
*G02F 1/1343* (2006.01)

(52) U.S. Cl.
CPC .. *G02F 1/133555* (2013.01); *G02F 1/133345* (2013.01); *G02F 1/134309* (2013.01);
(Continued)

(58) Field of Classification Search
CPC ......... G02F 1/133555; G02F 1/133371; G02F 1/133528; G02F 1/133345; G02F 1/134309
See application file for complete search history.

(56) References Cited

U.S. PATENT DOCUMENTS 8,466,860 B2 * 6/2013 Naka ................. G02F 1/133555
345/204
2003/0151709 A1 * 8/2003 Sakamoto ......... G02F 1/133555
349/113
(Continued)

FOREIGN PATENT DOCUMENTS

CN 1538217 A 10/2004
CN 102621753 A 8/2012
(Continued)

*Primary Examiner* — Dung Nguyen
(74) *Attorney, Agent, or Firm* — Andrew C. Cheng

(57) ABSTRACT

The present invention discloses a transflective liquid crystal display panel, including a first substrate, a second substrate and a liquid crystal layer located between the first substrate and the second substrate, and a region between the first substrate and the second substrate is divided into a plurality of transmission regions and a plurality of reflection regions, and thicknesses of the liquid crystal layers corresponded with the transmission regions and the reflection regions are equal, and the transmission region comprises a plurality of first electrodes, and the reflection region comprises a plurality of second electrodes, and an extension direction of the first electrode and the absorption axis of the first polarizer form a first included angle, and an extension direction and the absorption axis of the first polarizer form a second included angle.

9 Claims, 4 Drawing Sheets

(52) U.S. Cl.
CPC .................. *G02F 1/134363* (2013.01); *G02F 2001/133531* (2013.01)

(56) References Cited

U.S. PATENT DOCUMENTS

| | | | |
|---|---|---|---|
| 2006/0279670 A1* | 12/2006 | Tung | G02F 1/133555 349/56 |
| 2008/0030663 A1 | 2/2008 | Igeta et al. | |
| 2009/0168002 A1* | 7/2009 | Hirota | G02F 1/133555 349/126 |

FOREIGN PATENT DOCUMENTS

| | | |
|---|---|---|
| CN | 102789101 A | 11/2012 |
| CN | 104460130 A | 3/2015 |

* cited by examiner

TRANSFLECTIVE LIQUID CRYSTAL DISPLAY PANE

FIELD OF THE INVENTION

The present invention relates to a liquid crystal display field, and more particularly to a transflective liquid crystal display panel.

BACKGROUND OF THE INVENTION

According to different light sources, the liquid crystal display panels can be categorized into the transmission type, the reflective type and the transflective type. The transmission type liquid crystal display panel requires the backlight source. The light of the backlight source passes through the transparent electrode and the liquid crystal layer and shows the images; the reflective type liquid crystal display panel provides the light source with the front light source or the external environment. After the light from the front light source or the external environment passes through the liquid crystal layer and is reflected, and then passes through the liquid crystal layer and shows images, i.e. the light of the reflective type liquid crystal display panel needs to pass through the liquid crystal layer twice; the transflective type liquid crystal display panel combines the transmission type and the reflective type, and locates the transmission regions and the reflection regions in the panel at the same time. Both the backlight source and the light of the front light source or the external environment can be utilized. The transmission type liquid crystal display panel only utilizes the internal backlight source, and the images can be shown as there is no external light but the energy consumption is high; the reflective type liquid crystal display panel can fully utilizes the solar sunlight or other light sources from the outside, and the energy consumption is low but it has difficulty to show the images as there is no external light; the transflective type liquid crystal display panel can activate the backlight as there is no external light to show the images, and as there is external light, the backlight source is deactivated to fully utilize the external light. Thus the energy consumption can be saved. Therefore, the transflective type liquid crystal display panel can meet the design concept of energy saving and environment protection, and convenience more. Thus, it has been more widely applied in kinds of portable electronic products.

However, the transmission regions of the transflective type liquid crystal display panel utilizes the backlight source mode, and the light only needs to pass through the liquid crystal once; and the reflection regions uses the external light to be the light source, and thus, the light needs to penetrate the liquid crystal layer twice. Consequently, the phase delay as the light passes through the reflection region is twice of the transmission region. Accordingly, the reflection region and the transmission region are hard to have the same the electrooptical characteristic.

SUMMARY OF THE INVENTION

An objective of the present invention is to provide a transflective liquid crystal display panel which can make the light passing through the reflection region and the light passing through the transmission region have the same phase delay, and then the electrooptical characteristics of the reflection region and the transmission region are identical.

For solving the aforesaid technical issue, the technical solution employed by the present invention is:

The present invention provides a transflective liquid crystal display panel, comprising a first substrate, a second substrate and a liquid crystal layer located between the first substrate and the second substrate, and a side of the first substrate backing on the liquid crystal layer is provided with a first polarizer, and a side of the second substrate backing on the liquid crystal layer is provided with a second polarizer, and an absorption axis of the first polarizer is perpendicular with an absorption axis of the second polarizer, wherein a region between the first substrate and the second substrate is divided into a plurality of transmission regions and a plurality of reflection regions, and the transmission regions and the reflection regions are alternately located, and thicknesses of the liquid crystal layers corresponded with the transmission regions and the reflection regions are equal, and the transmission region comprises a plurality of first electrodes, and the reflection region comprises a plurality of second electrodes, and an extension direction of the first electrode and the absorption axis of the first polarizer form a first included angle, and an extension direction of the second electrode and the absorption axis of the first polarizer form a second included angle, and a phase delay of light passing through the reflection region once is a half of a phase delay of the light passing through the transmission region.

The first included angle is between 42° to 48°, and the second included angle is between 50° to 65°.

The first included angle is between 42° to 48°, and the second included angle is between 25° to 40°.

The reflection region further comprises a third electrode, and an extension direction of the third electrode and the absorption axis of the first polarizer form an included angle between 25° to 40°.

The first electrode, the second electrode and the third electrode are located at the same layer, and the first electrode comprises a plurality of first pixel electrodes and a plurality of first common electrodes which are alternately located, and the second electrode comprises a plurality of second pixel electrodes and a plurality of second common electrodes which are alternately located, and the third electrode comprises a plurality of third pixel electrodes and a plurality of third common electrodes which are alternately located.

The first substrate further comprises an insulation layer and a reflective layer, and the reflective layer is located on a surface of the first substrate facing the liquid crystal layer and located in a district of the reflection region, and the insulation layer is located on the reflective layer and extends to the transmission region.

The second pixel electrode and the second common electrode are manufactured with reflective metal material.

The insulation layer comprises a plurality of raised lines thereon, and a cross section of the raised line is rectangle, a trapezoid or a triangle, and the first electrode, the second electrode and the third electrode are respectively located on surfaces of the raised lines to form appearances identical with the raised lines.

A gap between the two adjacent first electrodes is smaller than a gap between the two adjacent second electrodes.

The first substrate is an array substrate, and the second substrate is a color film substrate, a glass substrate or a polyester substrate.

Compared with prior art, the technical solution of the present invention at least comprises the following benefits: in the transflective liquid crystal display panel according to the present invention, the transmission region comprises the first electrode, and the reflection region comprises the second electrode, and the extension direction of the first electrode and the absorption axis of the first polarizer form the first included angle, and the extension direction of the second electrode and the absorption axis of the first polarizer form the second included angle, and the absorption axis of the first polarizer is perpendicular with an absorption axis of the second polarizer, and thus, the included angles of the long axis of the liquid crystal in the reflection region with the absorption axis of the first polarizer and the absorption axis of the second polarizer are different from the included angles of the long axis of the liquid crystal in the transmission region with the absorption axis of the first polarizer and the absorption axis of the second polarizer, i.e. the pointing direction of the long axis of the liquid crystal in the reflection region; as the first electrode and the second electrode are applied with voltages, the liquid crystals appear to be optically anisotropic, and then, because the pointing direction of the long axis of the liquid crystal in the reflection region is different from the pointing direction of the liquid crystal in the transmission region, as the light passes through, the liquid crystal birefraction in the reflection region is different from the liquid crystal birefraction in the transmission region, and thus, the phase delay of light passing through the reflection region once is different from the phase delay of the light passing through the transmission region. When the first included angle is at the angle that makes the phase delay of the light passing through the transmission region the largest, the phase delay of light passing through the reflection region once is smaller than the phase delay of the light passing through the transmission region, and then, the phase delay of light passing through the reflection region once is optimized to be the half of the phase delay of the light passing through the transmission region, and the phase delay of the external light passing through the liquid crystal of the reflection region twice is equal to the phase delay of the light passing through the liquid crystal of the transmission region. Then, the electrooptical characteristics of the reflection region and the transmission region of the transflective liquid crystal display panel are identical.

BRIEF DESCRIPTION OF THE DRAWINGS

In order to more clearly illustrate the embodiments of the present invention, the following figures will be described in the embodiments are briefly introduced. It is obvious that the drawings are only some embodiments of the present invention, those of ordinary skill in this field can obtain other figures according to these figures without paying the premise.

DETAILED DESCRIPTION OF PREFERRED EMBODIMENTS

Embodiments of the present invention are described in detail with the technical matters, structural features, achieved objects, and effects with reference to the accompanying drawings as follows. It is clear that the described embodiments are merely part of embodiments of the present invention, but not all embodiments. Based on the embodiments of the present invention, all other embodiments to those of ordinary skill in the premise of no creative efforts obtained, should be considered within the scope of protection of the present invention.

The present invention can be applied in the In-Plane Switching blue phase liquid crystal display mode, the Fringe Field Switching (FFS) display mode and the fringe and in-plane switching (FIS) display mode. In the following embodiment, the traditional In-Plane Switching blue phase liquid crystal display mode is illustrated for explaining the technical solution of the present invention.

Figure 1A:
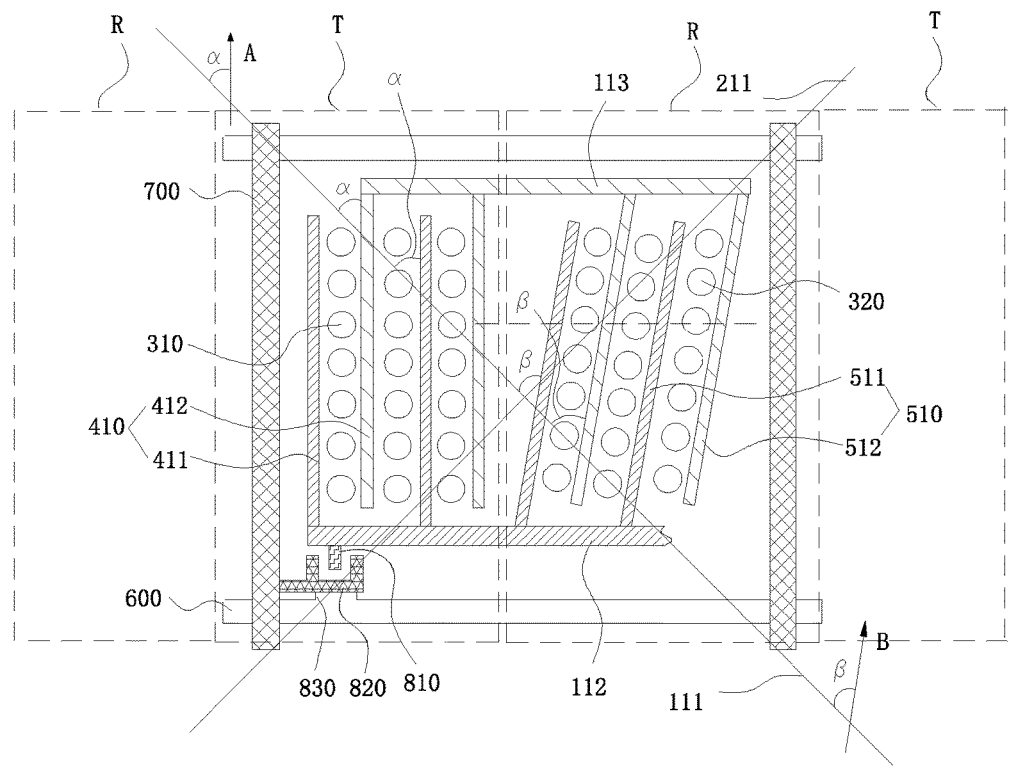
FIG. 1a is a top view diagram when the transflective liquid crystal display panel is not powered in the first embodiment of the present invention.
Figure 1B:
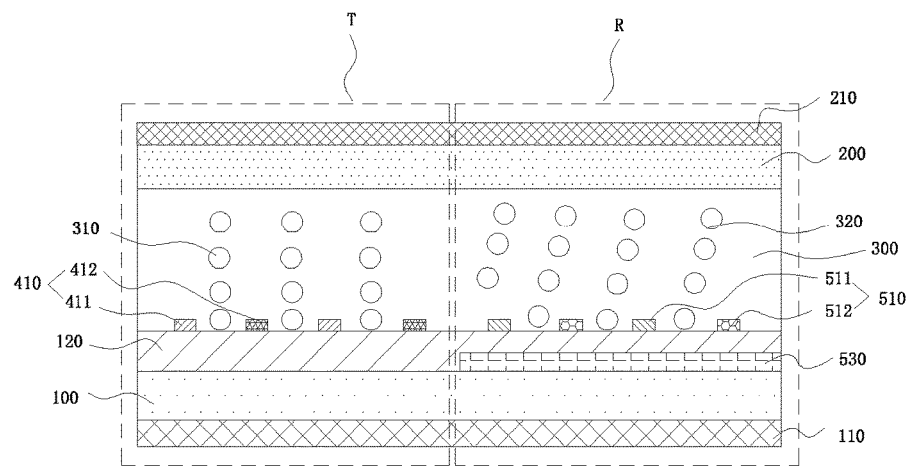
FIG. 1b is a section view diagram when the transflective liquid crystal display panel is not powered in the first embodiment of the present invention.

Please refer to FIG. 1a and FIG. 1b, and FIG. 1a is a top view diagram when the transflective liquid crystal display panel is not powered in the first embodiment of the present invention; FIG. 1b is a section view diagram when the transflective liquid crystal display panel is not powered in the first embodiment of the present invention. In FIG. 1a and FIG. 1b, the circle represents that the optically isotropic state as the liquid crystal 310 and the liquid crystal 320 are not applied with the voltage. The transflective liquid crystal display panel provided by this embodiment comprises a first substrate 100, a second substrate 200 and a liquid crystal layer 300 located between the first substrate 100 and the second substrate 200. In this embodiment, the liquid crystals in the liquid crystal layer 300 are blue phase liquid crystals. A side of the first substrate backing on the liquid crystal layer 300 is provided with a first polarizer 110, and a side of the second substrate 200 backing on the liquid crystal layer 300 is provided with a second polarizer 210, and an absorption axis 111 of the first polarizer 110 is perpendicular with an absorption axis 211 of the second polarizer 210. A region between the first substrate 100 and the second substrate 200 is divided into a plurality of transmission regions T and a plurality of reflection regions R, and the transmission regions T and the reflection regions R are alternately located. For convenience, only one transmission region T and one reflection region R are shown. The liquid crystal layer 300 comprises liquid crystal 310 in the transmission region T and liquid crystal 320 in the reflection region R. The thicknesses of the liquid crystal layers 300 corresponded with the transmission regions T and the reflection regions R are equal. In a district of the transmission region T, the first substrate 100 comprises a plurality of first electrodes 410 located thereon, and in a district of the reflection region R, the first substrate 100 comprises a plurality of second electrodes 420 located thereon, and an extension direction A of the first electrode 410 and the absorption axis 111 of the first polarizer 110 form a first included angle α, and an extension direction B of the second electrode 420 and the absorption axis 111 of the first polarizer 110 form a second included angle β, and then a phase delay of light passing through the reflection region once is a half of a phase delay of the light passing through the transmission region by adjusting the first included angle α and the second included angle β.

More specifically, the first substrate 100 further comprises an insulation layer 120 and a reflective layer 530 located thereon, and the reflective layer 530 is located on a side of the first substrate 100 facing the liquid crystal layer 300 and located in a district of the reflection region R to reflect the external incident light to make it pass through the liquid crystal 320 of the reflection region R, again. The reflective layer 530 can be manufactured by reflective metal, such as aluminum, molybdenum. The insulation layer 120 is located between the reflective layer 530 and the second electrode 510 to insulate the reflective layer 530 from the second electrode 510. The insulation layer 120 is a continuous layer, which covers the surface of the reflective layer 530 and extends to the transmission region T to cover the surface of the first substrate 100 corresponded with the transmission region T, and is located between the second electrode 510 and the first substrate 100. The surfaces of the insulation layer 120 facing the liquid crystal layer 300 are flat in the transmission region T and the reflection region R to ensure that the thicknesses of the liquid crystal layers 300 in the transmission region T and the reflection region R are equal. Namely, the present invention utilizes the single cell gap. All the plurality of first electrodes 410 and the plurality of second electrodes 510 are located at a surface of the insulation layer 120 facing the liquid crystal layer 300. The first electrode 410 comprises a plurality of first pixel electrodes 411 and a plurality of first common electrodes 412, and the first pixel electrodes 411 and the first common electrodes 412 are alternately located. As aforementioned, the extension direction A of the first electrode 410 and the absorption axis 111 of the first polarizer 110 form the first included angle α. Thus, both the first electrode 410 and the first common electrode 412 form the first included angles α with the absorption axis 111 of the first polarizer 110; the second electrode 510 comprises a plurality of second pixel electrodes 511 and a plurality of second common electrodes 512, and the second pixel electrodes 511 and the second common electrodes 512 are alternately located, and both the second pixel electrode 511 and the second common electrode 512 form the second included angles β with the absorption axis 111 of the first polarizer 110. Both the first pixel electrode 411 and the second pixel electrode 511 are connected to the pixel electrode line 112. Both the first common electrode 412 and the second common electrode 512 are connected to the common electrode line 113. The specific connection of the common electrode line 113 can be referred to prior art and not shown in the figure. Please refer to FIG. 1a. The first substrate 100 further comprises gate lines 600, data lines 700 and the thin film transistors (no indicated with number in the figure). The thin film transistor comprises a drain 810, a source 820 and a gate 830. The drain 810 is connected with the first pixel electrode 411 and the second pixel electrode 511 through the pixel electrode line 112. The source 820 is connected with the data line 700. The gate 830 is connected with the gate line 600. The transflective liquid crystal display panel applies the voltages to the first pixel electrode 411 and the second pixel electrode 511 through the data line 700, and applies the voltages to the first common electrode 412 and the second common electrode 512 through the common electrode line 113, and thus, the voltage differences generate between the first pixel electrode 411 and the second pixel electrode 511 and between the first common electrode 412 and the second common electrode 512, and the electrical fields generate between the first pixel electrode 411 and the second pixel electrode 511, and the electrical fields generate between the first common electrode 412 and the second common electrode 512. Thus, the liquid crystal 310 in the transmission region T and the liquid crystal 320 in the reflection region R are acted by the electrical fields. In the embodiment of the present invention, the liquid crystal 310 in the transmission region T and the liquid crystal 320 in the reflection region R are blue phase liquid crystals.

Figure 1C:
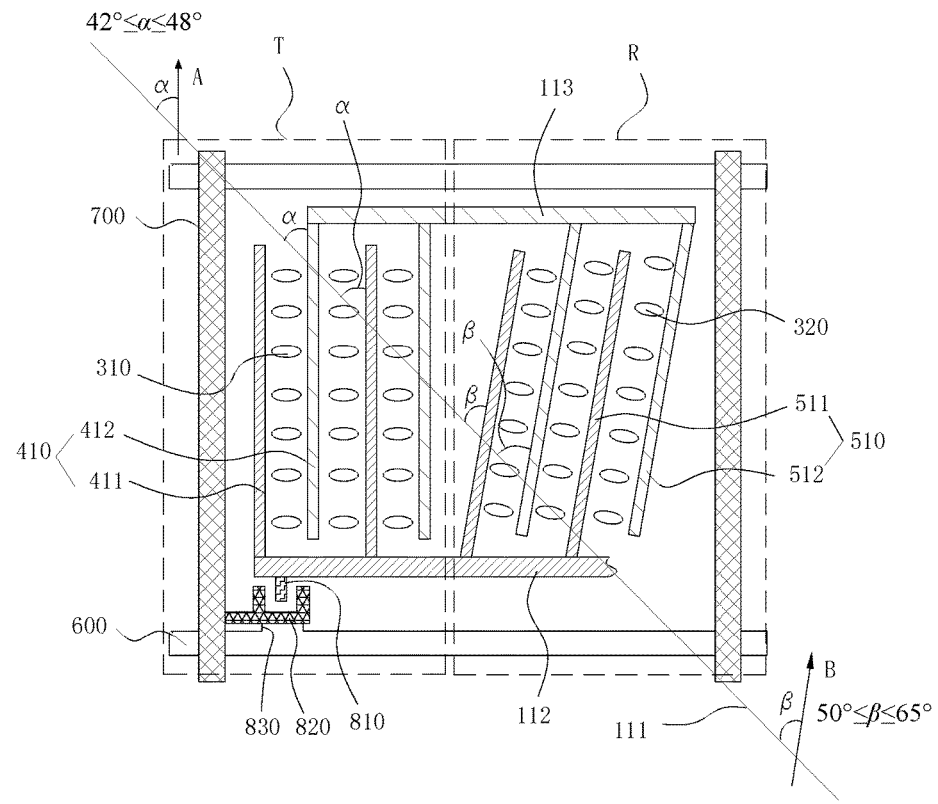
FIG. 1c is a top view diagram when the transflective liquid crystal display panel is powered in the first embodiment of the present invention.
Figure 1D:
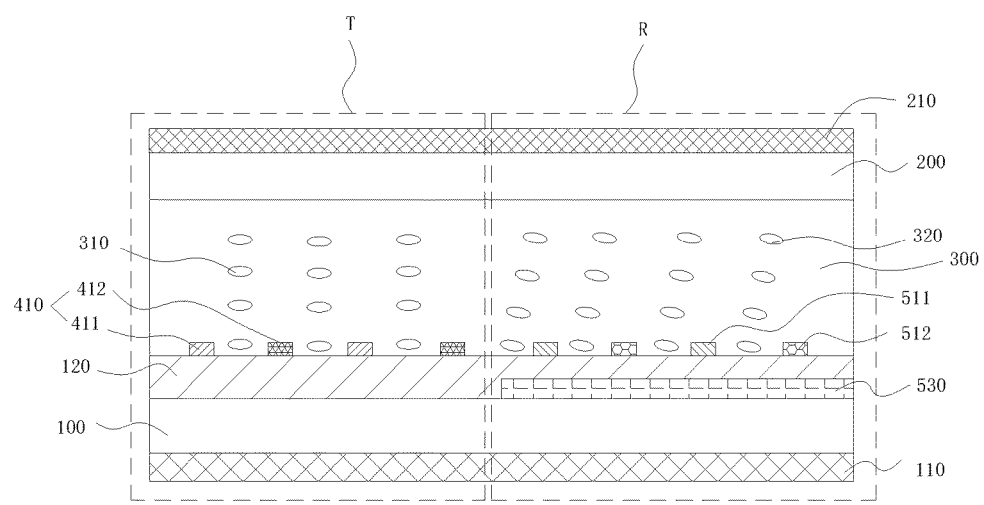
FIG. 1d is a section view diagram when the transflective liquid crystal display panel is powered in the first embodiment of the present invention.

Please refer to FIGS. 1c and 1d. FIG. 1c is a top view diagram when the transflective liquid crystal display panel is powered in the first embodiment of the present invention; FIG. 1d is a section view diagram when the transflective liquid crystal display panel is powered in the first embodiment of the present invention. In this embodiment, the first included angle α is between 42° to 48°, and preferably to be 45°. The second included angle β is between 50° to 65°. As applying the voltages to the first pixel electrode 411 and the first common electrode 412, and to the second pixel electrode 511 and the second common electrode 512, the liquid crystal 310 in the transmission region T and the liquid crystal 320 in the reflection region R are in the electrical field. Then, the liquid crystal 310 in the transmission region T and the liquid crystal 320 in the reflection region R are in the anisotropic state, and therefore to possess the birefraction and the polarization function. In FIG. 1a and FIG. 1b, the circle represents the optical anisotropic states as the liquid crystal 310 and the liquid crystal 320 are not applied with the voltages. In FIG. 1c and FIG. 1d, the ellipse represents the optical anisotropic states as the liquid crystal 310 and the liquid crystal 320 are applied with the voltages. The optical anisotropic states formed with the liquid crystal will increase along with the increase of the electrical field acting to the liquid crystal. In the transmission region T, the light enters the first polarizer 110 from the backlight source (not shown in the figure). The light parallel with the absorption axis 111 of the first polarizer 110 is absorbed with the first polarizer, and then the light passing through the first polarizer 110 becomes the linearly polarized light. The linearly polarized light passes through the liquid crystal 310 of the transmission region T and then becomes the elliptical polarized light. After the elliptical polarized light passed through the second polarizer 210, a portion is absorbed, and the other portion passes through the second polarizer 210 and shows images; in the reflection region R, the external natural light pass through the second polarizer 210 and then becomes the linearly polarized light for the first time. The linearly polarized light passes through the liquid crystal 320 of the reflection region R and then becomes the elliptical polarized light. After the elliptical polarized light is reflected by the reflective layer 530, and then enters the liquid crystal 320 of the reflection region R for the second time, the light remains to be the elliptical polarized light. After the elliptical polarized light entered the second polarizer 210 for the second time, a portion is absorbed and the other portion passes through the second polarizer 210 and shows images. As the position relationship of the first polarizer 110 and the second polarizer 120 are fixed, and as observing from the direction perpendicular with the first polarizer 110, if the pointing direction of the long axis of the liquid crystal is different from the angle of the first polarizer 110, the phase delays will be different after the light passed through the liquid crystal, and the ratio of the absorbed light and the transmitted light are different. In this embodiment, the first included angle α is between 42° to 48°, and preferably to be 45°. According to the experience, as the included angle of the pointing direction of the long axis of the liquid crystal and the first polarizer is about 45°, the transmission ratio of the light is the highest, and the phase delay of the light after passing through the liquid crystal is the largest. Therefore, under the same voltage, as the included angle of the pointing direction of the long axis of the liquid crystal and the first polarizer 110 is far less than or far larger than 45°, the phase delay of the light after passing through the liquid crystal generally becomes smaller. Therefore, in this embodiment, with locating the angle of the extension direction A of the first electrode 410, the extension direction B of the second electrode 510 and the absorption axis 111 of the first polarizer 110, the objective of locating the angle of the liquid crystal long axis and the absorption axis 111 of the first polarizer 110 can be achieved. As the included angle (i.e. the first included angle α) of extension direction A of the first electrode 410 in the transmission region T and the absorption axis 111 of the first polarizer 110 is 45° or about 45°, under the same circumstance that the voltages of the reflection region R and the transmission region T are the same, there must be corresponding angle smaller than or larger than 45° in the reflection region R so that the phase delay of light passing through the liquid crystal once is a half of the phase delay of the light passing through the transmission region T, and then the phase delay of the light passing through the transmission region T is equal to the phase delay after the light passes through the liquid crystal of the reflection region R twice, and then the electrooptical characteristics of the transmission region T and the reflection region R are identical. The display quality of the transflective liquid crystal display panel as the transmission region T and the reflection region R are driven with the same the driving system can be promoted. The included angle of the extension direction B of the second electrode 510 and the absorption axis 111 of the first polarizer 110 in this embodiment, i.e. the second included angle β is between 50° to 65°. In practical application, it required to combine the following parameters to select the specific value of the second included angle β in the range between 50° to 65°: the type of the liquid crystal, the widths, thicknesses of the first electrode 410 and the second electrode 510 and/or the gap between the two adjacent first electrodes 410 and the gap between the two adjacent second electrodes. The specific implement is: the first included angle α is set to be 45°. Several test panels are arranged according to the predetermined values of the several second included angles β (for instance, the second included angles β is 55°), and the different values correspond to the different test panels. Meanwhile, these test panels are all filled with the same type of the liquid crystal. Then, the voltage-transmission (V-T) curves of the transmission region T and the reflection region R of theses test panels are drew. In the condition that there is no ambient light and the backlight source is activated, the measured V-T curve is the V-T curve of the transmission region. In condition that the ambient light is strong and the backlight source is deactivated, the measured V-T curve is the V-T curve of the reflection region. If the V-T curves of the transmission region T and the reflection region R of one test panel arte consistent in the tolerance range. It means that the phase delay of the light passing through the reflection region R is a half of the phase delay of the light passing through the transmission region T. The values of the first included angle α and the second included angles β, and the values of the other parameters corresponded with the test panel can be the reference values in the practical production. With the specific experiment and design, the persons who are skilled in the art can understand based on the descriptions and prior art. No repeated description is introduced here.

In this embodiment, the extension direction of the first electrode of the transflective liquid crystal display panel and the absorption axis of the first polarizer form the first included angle of 45°, and the extension direction of the second electrode and the absorption axis of the first polarizer form the second included angle between 50° to 65°. As the power is applied to the first electrode and the second electrode, the liquid crystal appears to be optically anisotropic. Then, because the first include angle and the second included angle are different, i.e. the pointing direction of the long axis of the liquid crystal in the reflection region R is different from the pointing direction of the liquid crystal in the transmission region T. Therefore, as the light passes through, and as the width, the gap and the apply voltage of the first electrode in the transmission region T are equal to the width, the gap and the apply voltage of the second electrode in the reflection region R, the optical anisotropies formed by the liquid crystals of the transmission region T and the reflection region R are the same but the long axis of the liquid crystal of the transmission region T is perpendicular with the absorption axis of the first polarizer, and the long axis of the liquid crystal of the reflection region R is not perpendicular with the absorption axis of the first polarizer. Thus, the effective optical anisotropy of the liquid crystal of the reflection region R is smaller than the effective optical anisotropy of the liquid crystal of the transmission region T, and then the phase delay of the light passing through the liquid crystal of the reflection region R once is smaller than the phase delay of the light passing through the liquid crystal of the transmission region T. When the first included angle is 45°, the second included angle is to select a specific value in the range between 25° to 40° so that the phase delay of light passing through the liquid crystal of the reflection region R once can be optimized to be the half of the phase delay of the light passing through the liquid crystal of the transmission region T, and the phase delay of the external light passing through the liquid crystal of the reflection region R twice is equal to the phase delay of the light passing through the liquid crystal of the transmission region T. Then, the electrooptical characteristics of the transmission region T and the reflection region R of the transflective liquid crystal display panel are identical.

Figure 2:
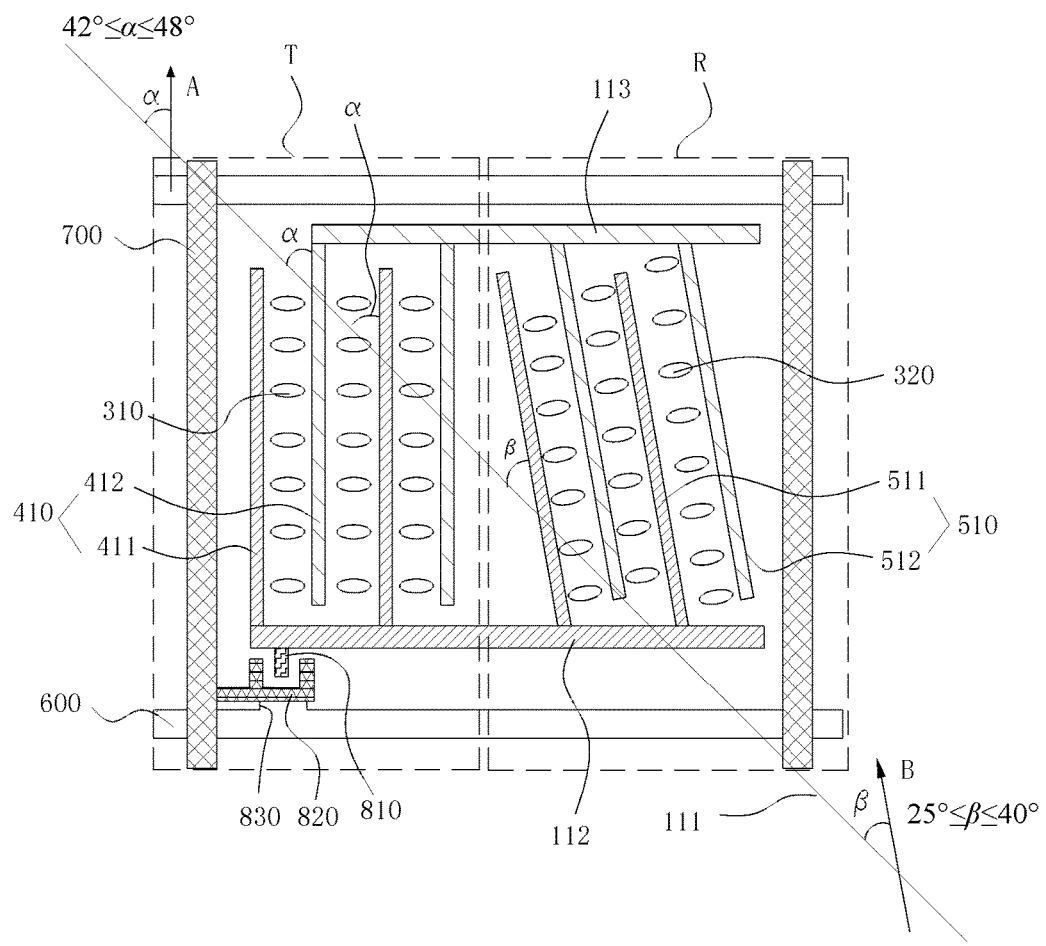
FIG. 2 is a top view diagram when the transflective liquid crystal display panel is powered in the second embodiment of the present invention.

Please refer to FIG. 2. FIG. 2 is a top view diagram when the transflective liquid crystal display panel is powered in the second embodiment of the present invention. The structure of the transflective liquid crystal display panel in this embodiment is basically the same as the structure of the transflective liquid crystal display panel in the first embodiment. The difference is: the second included angle β is between 25° to 40°. Namely, the included angle of the extension direction B of the second electrode 510 and the absorption axis of the first polarizer 110 is between 25° to 40°. In the transflective liquid crystal display panel of this embodiment, the phase delay of light passing through the liquid crystal 320 of the reflection region R once can be optimized to be the half of the phase delay of the light passing through the liquid crystal 310 of the transmission region T, and the phase delay of the external light passing through the liquid crystal of the reflection region R twice is equal to the phase delay of the light passing through the liquid crystal of the transmission region T. Then, the electrooptical characteristics of the transmission region T and the reflection region R of the transflective liquid crystal display panel are identical.

Figure 3:
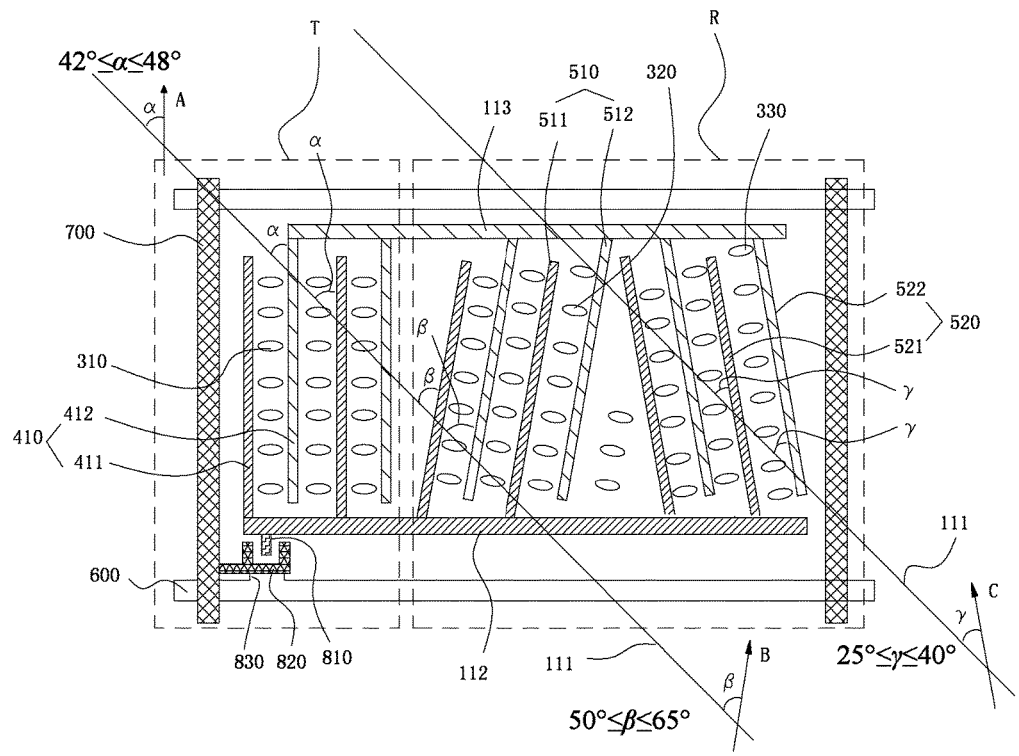
FIG. 3 is a top view diagram when the transflective liquid crystal display panel is powered in the third embodiment of the present invention.

Please refer to FIG. 3. FIG. 3 is a top view diagram when the transflective liquid crystal display panel is powered in the third embodiment of the present invention. The structure of the transflective liquid crystal display panel in this embodiment is basically the same as the structure of the transflective liquid crystal display panel in the first embodiment. The difference is: the reflection region further comprises a plurality of third electrodes 520. The extension direction C of the third electrodes 520 and the absorption axis 111 of the first polarizer 110 form the included angle γ between 25° to 40°. Namely, the transflective liquid crystal display panel in this embodiment comprises the first electrode 410, the second electrode 510 and the third electrode 520; the reflective layer 530 is located between the first substrate 100 and the second electrode 510, the third electrode 520. The third electrode 520 and the first electrode 410, the second electrode 510 and are located at the same layer, i.e. on the surface of the first substrate 100 facing the liquid crystal layer 300. The third electrode 520 comprises a plurality of third pixel electrodes 521 and a plurality of third common electrodes 522. The third pixel electrodes 521 and the third common electrodes 522 are alternately located. An extension direction of the third electrode 521 and the third common electrodes 522 form an included angle γ between 25° to 40° with the absorption axis 111 of the first polarizer 110. The third pixel electrode 521, the first pixel electrode 411 and the second pixel electrode 511 are connected with the pixel electrode line 112. The third common electrode 522, the first common electrode 412 and the second common electrode 512 are connected with the common electrode line 113. In this embodiment, the working principle of the transflective liquid crystal display panel is the same as the working principle of the transflective liquid crystal display panel in the first embodiment. No repeated description is introduced here. In this embodiment, the transflective liquid crystal display comprises the first electrode in the transmission region and the second electrode and the third electrode in the reflection region at the same time. The first electrode and absorption axis of the first polarizer form the included angle between 42° to 48°, and the second electrode and the second electrode and the absorption axis of the first polarizer form the included angle between 50° to 65°, and the third electrode and the absorption axis of the first polarizer form the included angle between 25° to 40°. The pointing direction of the long axis of the liquid crystal corresponded with the second electrode of the reflection region is different from the pointing direction of the long axis of the liquid crystal corresponded with the third electrode, i.e. the optical anisotropy of the liquid crystal corresponded with the second electrode of the reflection region is different from the optical anisotropy of the liquid crystal corresponded with the third electrode. Namely, the display mode of the reflection region is the double domain display. Thereby, the view angle of the transflective liquid crystal display can be improved to reduce the difference of the color shift as observing the transflective liquid crystal display from the various large view angles.

In this embodiment, the combination structure of the second electrode 510 and the third electrode 520 are merely exemplary. The second electrode 510 and the third electrode 520 also can be in other combination forms. For instance, the second electrode 510 and the third electrode 520 can respectively located at two sides of the first electrode 410.

Figure 4:
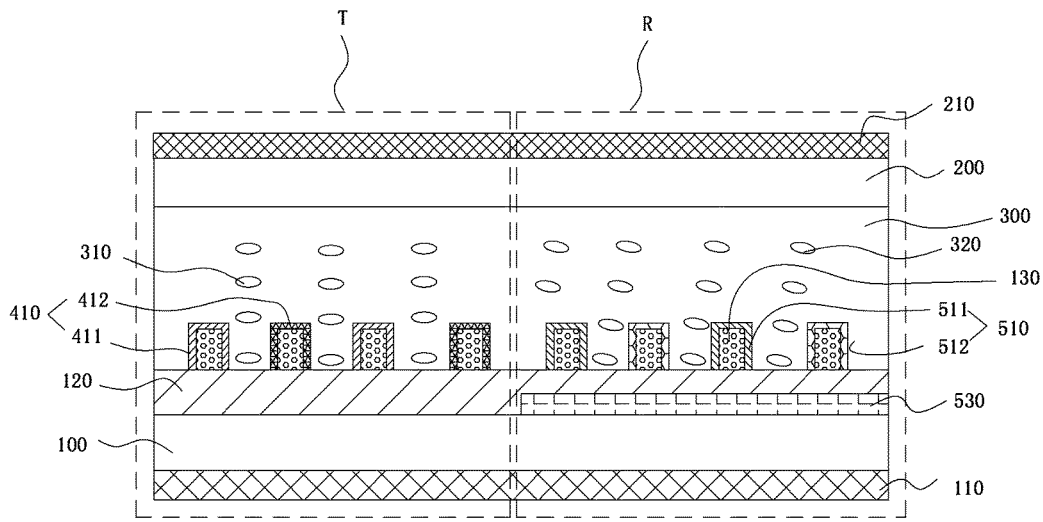
FIG. 4 is a section view diagram when the transflective liquid crystal display panel is powered in the third embodiment of the present invention.

Please refer to FIG. 4. FIG. 4 is a section view diagram when the transflective liquid crystal display panel is powered in the third embodiment of the present invention. The structure of the transflective liquid crystal display panel in this embodiment is basically the same as the structure of the transflective liquid crystal display panel in the third embodiment. The difference is: the insulation layer 120 further comprises a plurality of raised lines 130 thereon, and a cross section of the raised line 130 is rectangle, a trapezoid or a triangle, and one electrode is correspondingly located on one raised line 130, i.e. the first electrode 410, the second electrode 510 and the third electrode 520 are respectively located on surfaces of the raised lines 130 to form appearances identical with the raised lines 130. The thickness of the raised line 130 can be a half of the liquid crystal layer 300. Accordingly, the first electrode 410, the second electrode 510 and the third electrode 520 can be thicker. It can be understood that it can be thinner or thicker. In this embodiment, all the first electrode, the second electrode and the third electrode of the transflective liquid crystal display panel are located on the raised line, and thus, heights of the first electrode, the second electrode and the third electrode are increased so that the electrical field distributions between the first pixel electrode and the first common electrode, between the second pixel electrode and the second common electrode and between the third pixel electrode and the third common electrode can be higher. Namely, more liquid crystals can be positioned in the distributed range of the electrical field. Therefore, the driving voltage required for the transflective liquid crystal display panel is decreased to reduce the energy consumption.

In one embodiment of the present invention, the first substrate is an array substrate, and the second substrate is a color film substrate, a glass substrate or a polyester substrate.

In one embodiment of the present invention, the second pixel electrode, the second common electrode, the third pixel electrode and the third common electrode are manufacture with reflective metal material to increase the reflection area.

In one embodiment of the present invention, a gap between the two adjacent first electrodes is smaller than a gap between the two adjacent second electrodes.

In the embodiments of the present invention, the transmission region and the reflection region can be located in the same pixel or can be located in different pixels.

Above are embodiments of the present invention, which does not limit the scope of the present invention. Any modifications, equivalent replacements or improvements within the spirit and principles of the embodiment described above should be covered by the protected scope of the invention.

What is claimed is:

1. A transflective liquid crystal display panel, comprising a first substrate, a second substrate and a liquid crystal layer located between the first substrate and the second substrate, and a side of the first substrate backing on the liquid crystal layer is provided with a first polarizer, and a side of the second substrate backing on the liquid crystal layer is provided with a second polarizer, and an absorption axis of the first polarizer is perpendicular with an absorption axis of the second polarizer, wherein a region between the first substrate and the second substrate is divided into a plurality of transmission regions and a plurality of reflection regions, and the transmission regions and the reflection regions are alternately located, and thicknesses of the liquid crystal layers corresponded with the transmission regions and the reflection regions are equal, and the transmission region comprises a plurality of first electrodes, and the reflection region comprises a plurality of second electrodes, and an extension direction of the first electrode and the absorption axis of the first polarizer form a first included angle, and an extension direction of the second electrode and the absorption axis of the first polarizer form a second included angle, and a phase delay of light passing through the reflection region once is a half of a phase delay of the light passing through the transmission region, wherein the reflection region further comprises a third electrode, and an extension direction of the third electrode and the absorption axis of the first polarizer form an included angle between 25° to 40°.

2. The transflective liquid crystal display panel according to claim 1, wherein the first included angle is between 42° to 48°, and the second included angle is between 50° to 65°.

3. The transflective liquid crystal display panel according to claim 1, wherein the first included angle is between 42° to 48°, and the second included angle is between 25° to 40°.

4. The transflective liquid crystal display panel according to claim 1, wherein the first electrode, the second electrode and the third electrode are located at the same layer, and the first electrode comprises a plurality of first pixel electrodes and a plurality of first common electrodes which are alternately located, and the second electrode comprises a plurality of second pixel electrodes and a plurality of second common electrodes which are alternately located, and the third electrode comprises a plurality of third pixel electrodes and a plurality of third common electrodes which are alternately located.

5. The transflective liquid crystal display panel according to claim 4, wherein the second pixel electrode and the second common electrode are manufactured with reflective metal material.

6. The transflective liquid crystal display panel according to claim 1, wherein the first substrate further comprises an insulation layer and a reflective layer, and the reflective layer is located on a surface of the first substrate facing the liquid crystal layer and located in a district of the reflection region, and the insulation layer is located on the reflective layer and extends to the transmission region.

7. The transflective liquid crystal display panel according to claim 6, wherein the insulation layer comprises a plurality of raised lines thereon, and a cross section of the raised line is rectangle, a trapezoid or a triangle, and the first electrode, the second electrode and the third electrode are respectively located on surfaces of the raised lines to form appearances identical with the raised lines.

8. The transflective liquid crystal display panel according to claim 6, wherein a gap between the two adjacent first electrodes is smaller than a gap between the two adjacent second electrodes.

9. The transflective liquid crystal display panel according to claim 6, wherein the first substrate is an array substrate, and the second substrate is a color film substrate, a glass substrate or a polyester substrate.

* * * * *